United States Patent [19]
Nakamura

[11] 4,303,311
[45] Dec. 1, 1981

[54] SHORT DISTANCE ZOOM LENS SYSTEM
[75] Inventor: Soichi Nakamura, Kamakura, Japan
[73] Assignee: Nippon Kogaku K.K., Tokyo, Japan
[21] Appl. No.: 70,102
[22] Filed: Aug. 27, 1979
[30] Foreign Application Priority Data
   Aug. 29, 1978 [JP] Japan .................. 53-104471
[51] Int. Cl.³ ............................ G02B 15/18
[52] U.S. Cl. .................................. 350/427
[58] Field of Search ................ 350/184, 186, 427
[56] References Cited
   U.S. PATENT DOCUMENTS
   3,603,669  9/1971  Lai ........................ 350/186
   3,705,759 12/1972  Cook et al. ............... 350/184
   3,848,969 11/1974  Tajima .................... 350/184

Primary Examiner—John K. Corbin
Assistant Examiner—Scott J. Sugarman
Attorney, Agent, or Firm—Shapiro and Shapiro

[57] ABSTRACT

A short distance zoom lens system for forming an image of an object lying at any short distance at a predetermined short distance comprises, in order from the object side, a first group which is a divergent lens group, a second group which is a convergent lens group, and a third group which is a divergent lens group. The second and the third group are movable relative to each other in the direction of the optic axis to effect a magnification change. The first group is stationary during the magnification change and is movable in the direction of the optic axis independently of the second and third groups in accordance with the distance to the object.

6 Claims, 5 Drawing Figures

SHORT DISTANCE ZOOM LENS SYSTEM

BACKGROUND OF THE INVENTION

1. Field of the Invention

This invention relates to a zoom lens system, and more particularly to a short distance zoom lens having a wide angle of view and for forming an image at a predetermined short distance of an object lying at any short distance, or for forming an image at any short distance of an object lying at a predetermined short distance. Specifically, the invention relates to an enlarging lens used for enlarged printing of photographs.

2. Description of the Prior Art

As a zoom lens covering a wide angle, a lens comprising two groups, i.e. a forward group which is a divergent lens group and a rearward group which is a convergent lens group is already known and this type of zoom lens has been undergoing remarkable development. However, when such a zoom optical system is used for short distance, the forward group is moved for a magnification change. Therefore, with focusing being effected by the movement of the forward group as commonly adopted in such zoom lens systems, it is impossible to maintain the image plane always strictly at a predetermined position while zooming is being effected with respect to the object plane lying at any short distance. Moreover, if zooming is effected with respect to an object lying at a short distance, distortion varies so significantly that such conventional zoom lens systems have been unsuitable as an enlarging lens.

SUMMARY OF THE INVENTION

It is an object of the present invention to provide a short distance zoom lens having a wide angle of view which is of such high performance that the position of the image plane with respect to an object lying at any short distance is always fixed and such that distortion and its variation resulting from a magnification change are small.

The invention will become fully apparent from the following detailed description taken in conjunction with the accompanying drawings.

BRIEF DESCRIPTION OF THE DRAWINGS

FIG. 2 schematically illustrates the basic construction of FIG. 1, FIG. 2(a) showing the condition on the long focal length side and FIG. 2(b) showing the condition on the short focal length side.

DESCRIPTION OF THE PREFERRED EMBODIMENTS

The present invention, as shown in FIG. 1(a) and b, comprises, in order from the object side, a divergent lens group as a first group $G_1$, a convergent lens group as a second group $G_2$, and a divergent lens group as a third group $G_3$. Magnification may be changed by relative movement of the second group $G_2$ and the third group $G_3$, and the image plane may be always maintained fixed by fixing the first group $G_1$ with respect to the image plane during a magnification change. Also, the symmetry of the basic optical system is contrived by introducing the third group $G_3$, and the distortion and its variation resulting from a magnification change are made small by letting the third group $G_3$ serve the role of a compensator. FIG. 1(a) and FIG. 1(b) schematically show the basic construction under the long focal length side condition and the short focal length side condition, respectively.

The construction of the present invention will hereinafter be described in detail by reference to FIGS. 2(a) and (b). The present invention will be described as a zoom lens system comprising three groups, i.e. a divergent group of focal length $f_1$ as the first group and a convergent group of focal length $f_2$ as the second group, and further having a divergent group of focal length $f_3$ as the third group $G_3$. FIGS. 2(a) and (b) schematically show the construction under the long focal length condition (hereinafter referred to as the first condition) and the short focal length condition (hereinafter referred to as the second condition), respectively.

Figure 2:
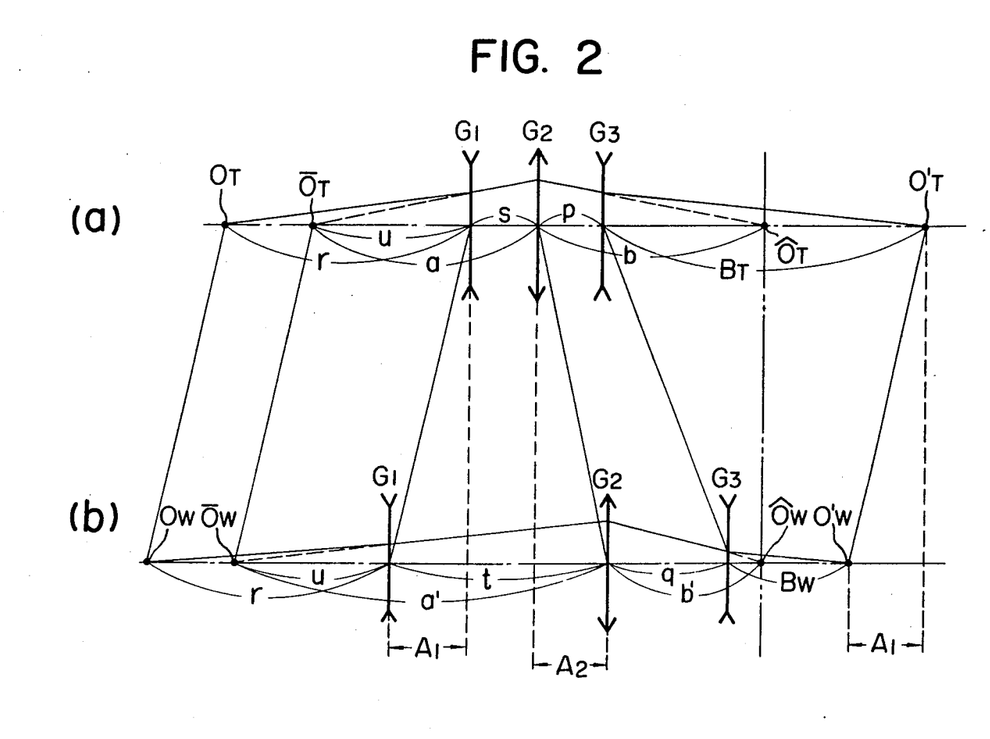

Assume that the object point always lies at a predetermined distance r from the first group $G_1$ in the first condition and in the second condition, and that the object points in the respective conditions are $O_T$ and $O_W$. The image points $\overline{O}_T$ and $\overline{O}_W$ of these object points are formed by the first group $G_1$ at a predetermined distance U. These image points $\overline{O}_T$ and $\overline{O}_W$ are also object points with respect to the second group $G_2$, and it is assumed that the image points formed by the second group $G_2$ are $\hat{O}_T$ and $\hat{O}_W$, respectively. These image points $\hat{O}_T$ and $\hat{O}_W$ formed by the second group $G_2$ are the imaginary image points when the present system is regarded as a zoom system comprising two groups, i.e. the first group $G_1$ and the second group $G_2$. In FIG. 2, it is assumed that such imaginary image points $\hat{O}_T$ and $\hat{O}_W$ are always maintained at predetermined positions, and such positions are shown as the standard. These imaginary image points $\hat{O}_T$ and $\hat{O}_W$ provide the object points with respect to the newly introduced third group $G_3$, and final image points $O'_T$, and $O'_W$, are formed by the third group $G_3$. Let a and b be the distances from the second group $G_2$ in the first condition to the object point $\hat{O}_T$ and to the image point $\hat{O}_T$, respectively, and let $B_T$ be the distance from the third group to the final image point $O'_T$. Also, let a' and b' be the distances from the second group $G_2$ in the second condition to the object point $O_W$ and to the image point $\hat{O}_W$ with respect, and let $B_W$ be the distance from the third group $G_3$ to the final image point $O'_W$.

A zoom lens system comprising two groups, i.e. the first group $G_1$ which is a divergent lens group and the second group $G_2$ which is a convergent lens group is known, and in the construction comprising these two groups alone, the distances between the object points and the imaginary image points, namely, the distance between $O_T$ and $\hat{O}_T$ and the distance between $O_W$ and $\hat{O}_W$ vary as shown. This is attributable to the fact that the object points $O_T$ and $O_W$ lie at short distances. However, if the third group $G_3$, which is a divergent lens group, is provided in addition to said two groups, and if the amounts of displacement of the final image point $O'_T$ in the first condition by the third group $G_3$ and the final image point $O'_W$ in the second condition are made equal to the amount of movement $A_1$ of the first group $G_1$ for a magnification change, the distances from the object points $O_T$ and $O_W$ to the final image points $O'_T$ and $O'_W$ can be maintained constant. In other words, if the first group $G_1$ is fixed, namely, $A_1=0$, during the magnification change and substantial magnification change is effected by the second group $G_2$ and the third group $G_3$, the final image point of the object point lying at a predetermined short distance from the first group $G_1$ is always maintained at a predetermined position. This is the above-described basic construction of the present invention.

The conditions for this will hereinafter be derived after. In FIGS. 2(a) and (b), the following relations are established from the image forming formulas of the first and the second conditions, respectively, with respect to the third group $G_3$:

$$\frac{1}{-(b-p)} + \frac{1}{B_T} = \frac{1}{f_3} \quad (1)$$

$$\frac{1}{-(b'-q)} + \frac{1}{B_W} = \frac{1}{f_3} \quad (2)$$

Here, if the distance between the second group $G_2$ and the third group $G_3$ is p for the first condition and q for the second condition, the following relation is established in order that the amounts of displacement of the final image points $O'_T$ and $O'_W$ in the first condition and the second condition may be $A_1$:

$$B_T = B_W + A_1 + (b-p) - (b'-q)$$

If $p = b - p$ and $Q = b' - q$, then equations (1) and (2) may be rewritten as follows:

$$\frac{1}{-p} + \frac{1}{B_W + A_1 + p - Q} = \frac{1}{f_3} \quad (1')$$

$$\frac{1}{-Q} + \frac{1}{B_W} = \frac{1}{f_3} \quad (2')$$

If $B_W$ is eliminated from these equations, $f_3$ is found to be $$f_3 = \frac{(Q - p - A_1)(Q + p)}{2A_1}$$

$$- \sqrt{\left(\frac{(Q - p - A_1)(Q + p)}{2A_1}\right)^2 + \frac{pQ(Q - p - A_1)}{A_1}}$$

By constructing the third group $G_3$ so as to satisfy this equation, the image point for an object lying at a predetermined short distance can be strictly maintained at a predetermined position even during a magnification change. This status is shown in FIGS. 1(a) and (b), wherein the magnification change takes place with the object surface O and the image plane O' fixed. The amounts of movement X and Y of the second group $G_2$ and the third group $G_3$, respectively, between the first condition and the second condition may be obtained as follows:

$$X = A_1 + A_2$$

$$Y = B_T - B_W$$

The value of $B_W$ is $$B_W = f_3 Q/(Q + f_3)$$

Also, the overall magnification $\beta_T$ in the first condition may be represented as the product of the magnifications $\beta_{1T}$, $\beta_{2T}$ and $\beta_{3T}$ of the first group $G_1$, the second group $G_2$ and the third group $G_3$, respectively, in this condition, and the overall magnification $\beta_W$ in the second condition may be represented as the product of the magnifications $\beta_{1W}$, $\beta_{2W}$ and $\beta_{3W}$ of the respective groups in this condition. Since the object distance with respect to the first group $G_1$ is always constant, $\beta_{1T} = \beta_{1W}$ and this may be replaced by $\beta_1$. Also, from FIGS. 2(a) and (b), $$\beta_{2T} = -\frac{b}{a}$$

$$\beta_{3T} = \frac{B_T}{b - p}$$

$$\beta_{2W} = -\frac{b'}{a'} = \frac{-b + A_2}{a + A_1 + A_2}$$

$$\beta_{3W} = \frac{B_W}{b' - q}$$

Accordingly, $$\beta_T = \beta_1 \times -\left(\frac{b}{a}\right) \times \left(\frac{B_T}{b - p}\right)$$

$$\beta_W = \beta_1 \times \left(\frac{-b + A_2}{a + A_1 + A_2}\right) \times \left(\frac{B_W}{b' - q}\right)$$

The zoom ratio is $\beta_T/\beta_W$. In this construction, focusing is effected by moving the second group and the third group independently of each other and the position of the image plane can be maintained constant even for a different object distance.

In the above-described basic construction of the present invention, it is desirable that the following conditions be satisfied. First, where a zoom system comprising two groups, i.e., the first group $G_1$ and the second group $G_2$, is supposed, it is necessary for simply realizing the symmetry of the optical system of the present invention that the first group $G_1$ providing the compensator does not effect a U-turn movement for a magnification change. This condition means that the magnification of the second group $G_2$ does not pass through a one-to-one magnification in the first condition and that the following relation is satisfied:

$$|\beta_{2W}| < |\beta_{2T}| \leq 1 \quad \text{(a)}$$

where $\beta_{2T}$ is the magnification of the second group in the first condition and $\beta_{2W}$ is the magnification of the second group in the second condition.

Next, the Petzval sum PS of the entire system will be considered. Here, $f_1$ and $f_3 < 0$ and $f_2 > 0$, and $$S = (1/f_1 N_1) + (1/f_2 N_2) + (1/f_3 N_3)$$

where $N_1$, $N_2$ and $N_3$ are apparent refractive indices of the first, the second, and the third group, respectively. If each group comprises components in a range which may be assumed to be a thin-walled close contact system, $N_1$, $N_2$ and $N_3$ can only assume values in the range from 1.0 to 2.0 at best and, therefore, the following relation becomes necessary in order that the Petzval sum may be maintained small:

$$\left| \frac{1}{f_1 N_2} + \frac{1}{f_3 N_3} \right| \approx \frac{1}{f_2 N_2}$$

and in the construction of the present invention, it is desirable that the value of the focal length $f_1$ of the first group $G_1$ be determined in the following range:

$$1.5 f_2 < |f_1| < 2.5 f_2 \quad \text{(b)}$$

Figure 1:
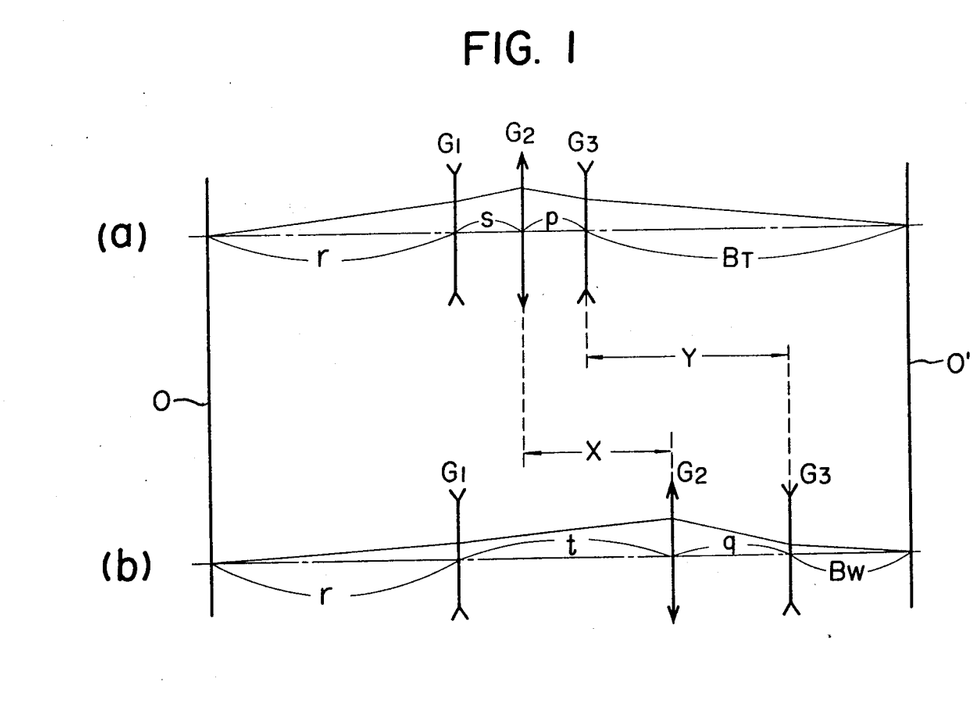
FIG. 1 schematically shows a basic construction of the zoom lens system of the present invention, FIG. 1(a) showing the condition on the long focal length side and FIG. 1(b) showing the condition on the short focal length side.

Further, if, as shown in FIG. 1, the spacing between the first group $G_1$ and the second group $G_2$ is S in the first condition and t in the second condition, it is desirable to satisfy the following relations:

$$0.5 < (p/S) < 1.2 \quad \text{(c)}$$

$$0.5 < (q/t) < 1.2 \quad \text{(d)}$$

By this, the optical system can be made more approximately a symmetrical type and the distortion may be essentially minimized. This leads to an increased degree of freedom with which the other aberrations are corrected and enables the easy obtainment of an optical system having a good aberration balance.

From the foregoing, the basic construction of the zoom lens system according to the present invention may be obtained and thereafter, each group may be formed by selecting lens components to minimize the aberrations.

With regard to the constructions of the respective groups, it is desirable that the first group be a divergent group including at least one positive lens component to correct the distortion, that the second group be a convergent group including at least three separate lens components, and that the third group, which has a relatively great amount of movement, comprises an achromatic doublet negative component of a relatively small refractive power.

Figure 3:
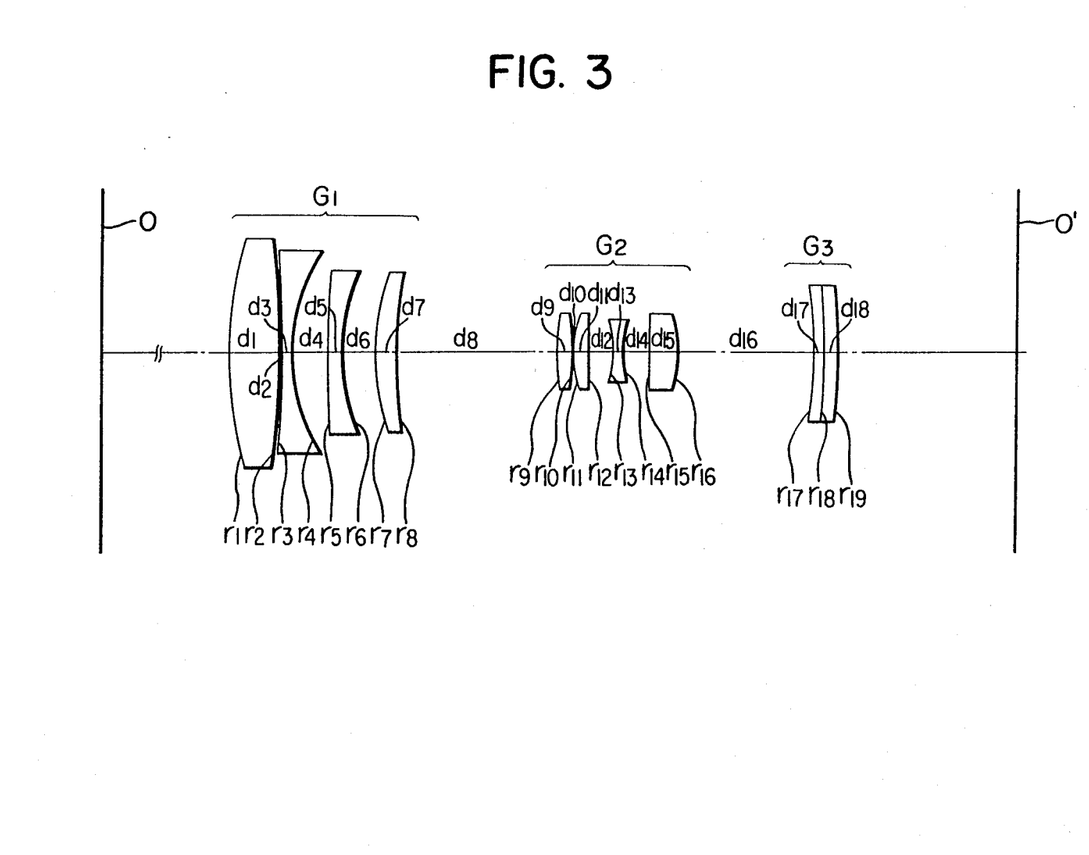
FIG. 3 shows the lens arrangement of the present invention.

Embodiments of the present invention will now be described. A first and a second embodiment which will hereinafter be described are both designed as an enlarging zoom lens and their lens arrangements are as shown in FIG. 3. In FIG. 3, the object surface O is a surface on which photographic paper is placed, and the image plane O' is a plane on which film is placed. In the actual use, illumination is effected from the right side of the Figure, and the image on the film surface O' is projected upon the photographic paper O, and print is effected by a predetermined time of exposure. That is, in this case, the direction in which light rays travel is reverse to the aforementioned case, and the object and the image are reversed. However, this is one way of use based on the principle of reversibility of light rays of the zoom lens according to the present invention, and it does not depart from the scope of the present invention. Here, the image of the object surface (film) O' disposed at a fixed position is formed on the image plane (photographic) O, and the position of the image plane (photographic) O may be set to any distance by movement of the first group $G_1$. The numerical data of each embodiment will be shown below.

In both of the two embodiments, magnification is varied from $-\frac{1}{8}$ to $-1/5$ and F-number is also varied from 5.6 to 8.4. Also, the distance from the object surface to the foremost lens surface, namely, the operating distance $d_0$ in the case where the zoom lens is an enlarging lens can be varied substantially within the range of $\pm 200$ mm about the following value. Such variation in the operating distance may be effected by movement of the first group $G_1$. At this time, the magnification range somewhat varies from the foregoing. In the tables below, r is the radius of curvature of each lens surface, d is the spacing between adjacent lens surfaces, and n and $\nu$ are the refractive index and Abbe number for d-line (wavelength 587.6 nm) and $B_f$ represents the back focus. The subscripts represent the order from the object side. The units of r and d are mm.

First Embodiment:
Total focal length $f = 52.9 \sim 65.3 \sim 80.1$

| | | $d_0 = 403.8934$ | | |
|---|---|---|---|---|
| | $r_1 = 84.985$ | $d_1 = 10.2$ | $n_1 = 1.68893$ | $\nu_1 = 31.1$ |
| | $r_2 = -363.927$ | $d_2 = 0.9$ | | |
| | $r_3 = -599.068$ | $d_3 = 1.9$ | $n_2 = 1.52944$ | $\nu_2 = 51.8$ |
| $f_1 = -97.17$ | $r_4 = 38.325$ | $d_4 = 8.5$ | | |
| | $r_5 = 808.067$ | $d_5 = 1.9$ | $n_3 = 1.74443$ | $\nu_3 = 49.4$ |
| | $r_6 = 36.093$ | $d_6 = 7.5$ | | |
| | $r_7 = 42.0$ | $d_7 = 4.9$ | $n_4 = 1.62230$ | $\nu_4 = 53.1$ |
| | $r_8 = 166.523$ | | | |
| | | $d_8 = 34.6194 \sim 20.15 \sim 4.9468$ | | |
| | $r_9 = 50.478$ | $d_9 = 2.85$ | $n_5 = 1.50032$ | $\nu_5 = 81.9$ |
| | $r_{10} = -104.125$ | $d_{10} = 0.1$ | | |
| | $r_{11} = 23.244$ | $d_{11} = 3.7$ | $n_6 = 1.50032$ | $\nu_6 = 81.9$ |
| $f_2 = 51.94$ | $r_{12} = 117.891$ | $d_{12} = 4.89$ | | |
| | $r_{13} = -54.464$ | $d_{13} = 1.9$ | $n_7 = 1.67163$ | $\nu_7 = 38.8$ |
| | $r_{14} = 24.276$ | $d_{14} = 6.0$ | | |
| | $r_{15} = 586.998$ | $d_{15} = 6.1$ | $n_8 = 1.63854$ | $\nu_8 = 55.5$ |
| | $r_{16} = -28.238$ | | | |
| | | $d_{16} = 29.5067 \sim 10.9499 \sim 10.0795$ | | |
| $f_3 = -413.91$ | $r_{17} = -75.0$ | $d_{17} = 1.5$ | $n_9 = 1.5168$ | $\nu_9 = 64.2$ |
| | $r_{18} = -217.0$ | $d_{18} = 3.0$ | $n_{10} = 1.6727$ | $\nu_{10} = 32.2$ |
| | $r_{19} = -132.064$ | | | |
| | | $B_f = 38.7 \sim 71.7 \sim 87.8$ | | |

Second Embodiment:
Total focal length $f = 52.9 \sim 65.3 \sim 80.1$

| | $d_0 = 403.8934$ | | |
|---|---|---|---|
| $r_1 = 81.912$ | $d_1 = 10.2$ | $n_1 = 1.59507$ | $\nu_1 = 35.6$ |
| $r_2 = -398.128$ | $d_2 = 0.9$ | | |
| $r_3 = 231.320$ | $d_3 = 1.9$ | $n_2 = 1.67790$ | $\nu_2 = 55.5$ |

-continued

| | | | | |
|---|---|---|---|---|
| $f_1 =$ −97.17 | $r_4 = 47.0$ | $d_4 = 8.5$ | | |
| | $r_5 = -250.27$ | $d_5 = 1.9$ | $n_3 = 1.713$ | $\nu_3 = 53.9$ |
| | $r_6 = 34.11$ | $d_6 = 6.9$ | | |
| | $r_7 = 41.2$ | $d_7 = 4.9$ | $n_4 = 1.56965$ | $\nu_4 = 49.5$ |
| | $r_8 = 552.564$ | | | |
| | | $d_8 = 36.533 \sim 22.0641 \sim 6.8608$ | | |
| | $r_9 = 47.04$ | $d_9 = 2.8$ | $n_5 = 1.65830$ | $\nu_5 = 57.3$ |
| | $r_{10} = -173.84$ | $d_{10} = 0.1$ | | |
| | $r_{11} = 24.2$ | $d_{11} = 3.79$ | $n_6 = 1.6968$ | $\nu_6 = 55.6$ |
| $f_2 =$ 51.94 | $r_{12} = 45.770$ | $d_{12} = 4.89$ | | |
| | $r_{13} = -146.51$ | $d_{13} = 1.9$ | $n_7 = 1.80518$ | $\nu_7 = 25.5$ |
| | $r_{14} = 23.2$ | $d_{14} = 5.3$ | | |
| | $r_{15} = 141.79$ | $d_{15} = 9.6$ | $n_8 = 1.62588$ | $\nu\nu_8 = 35.6$ |
| | $r_{16} = -33.244$ | | | |
| | | $d_{16} = 27.9013 \sim 9.3444 \sim 8.4740$ | | |
| $f_3 =$ −413.91 | $r_{17} = -70.0$ | $d_{17} = 1.5$ | $n_9 = 1.62041$ | $\nu_9 = 60.3$ |
| | $r_{18} = -768.8$ | $d_{18} = 3.0$ | $n_{10} = 1.62230$ | $\nu_{10} = 53.1$ |
| | $r_{19} = -98.862$ | | | |
| | $B_f = 37.0 \sim 70.0 \sim 86.1$ | | | |

The values for the conditions (a)–(d) for the First and Second embodiments, which are readily derivable from the values given in each embodiment, are given in the following table:

| conditions | embodiments | FIRST | SECOND |
|---|---|---|---|
| (a) | $|\beta_{2W}|$ | 0.60 | 0.60 |
| | $|\beta_{2T}|$ | 0.91 | 0.91 |
| (b) | $|f_1|$ | $1.87f_2$ | $1.87f_2$ |
| (c) | $\dfrac{P}{S}$ | 0.72 | 0.72 |
| (d) | $\dfrac{q}{t}$ | 0.69 | 0.69 |

Figure 4:
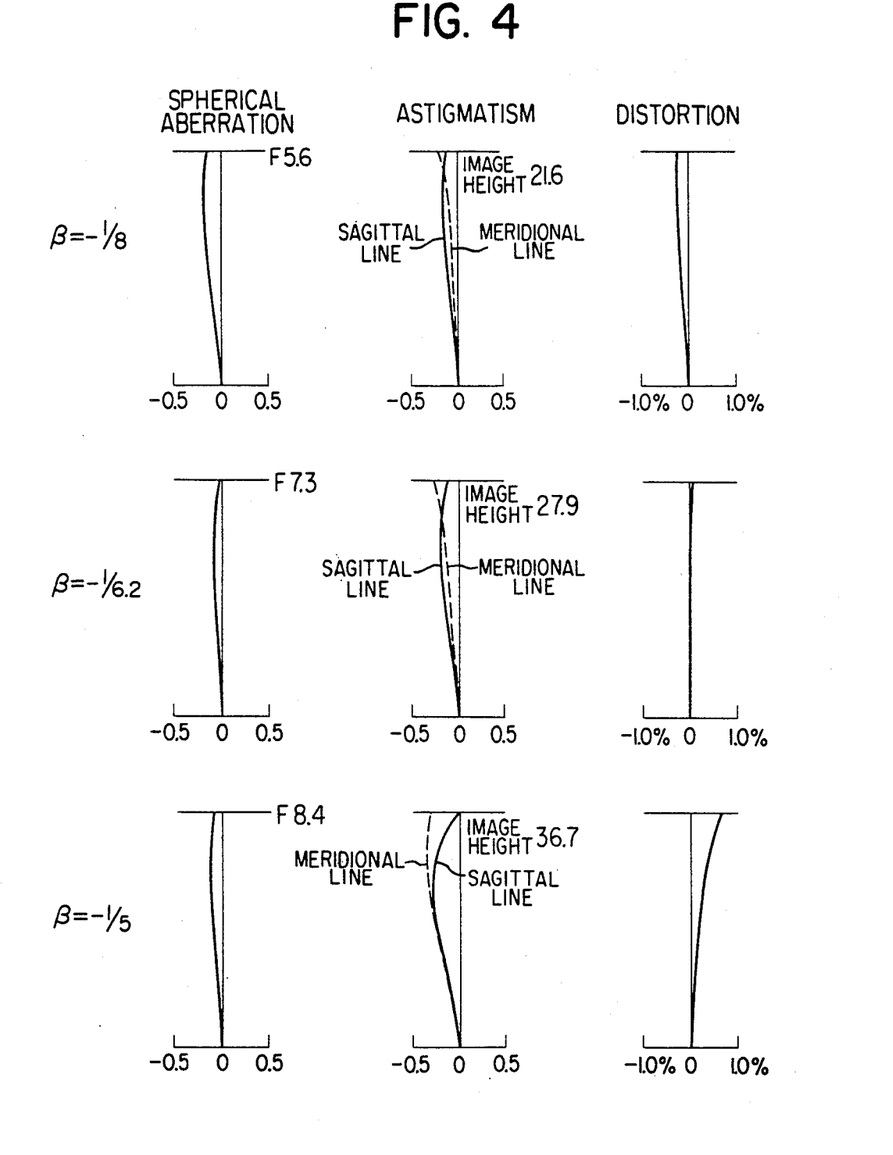
FIG. 4 shows the aberrations in a first embodiment of the present invention.
Figure 5:
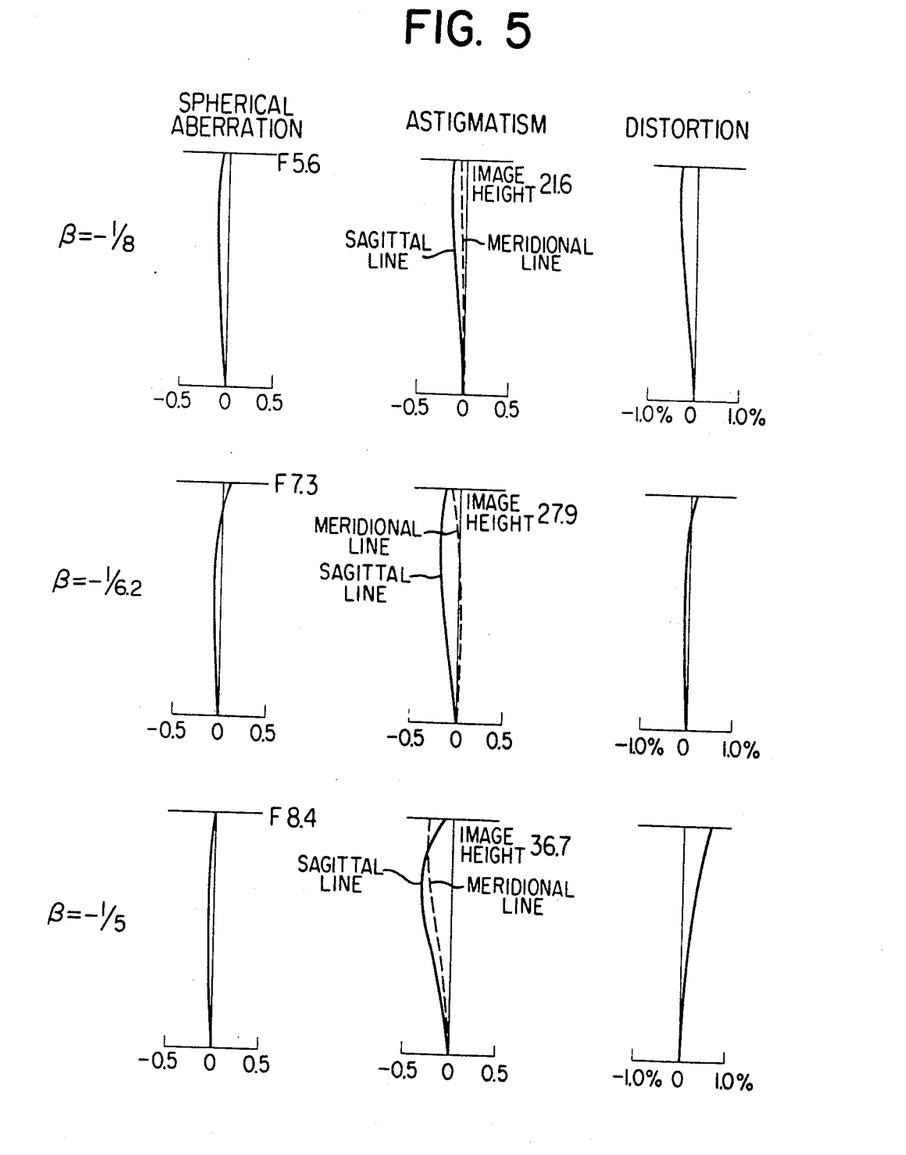
FIG. 5 shows the aberrations in a second embodiment of the present invention.

The aberrations in the first and the second embodiments are illustrated in FIGS. 4 and 5, respectively. The aberrations have been actually calculated by regarding the plane on which the print paper is placed as the object surface and by regarding the plane on which the film is placed as the image plane. Accordingly, the magnification is smaller on the short focal length side and greater on the long focal length side. The respective aberration figures show each of the cases where the magnification $\beta$ is $-\frac{1}{8}$, $-1/6.2$ and $-1/5$.

As seen from the aberration figures, these embodiments have an excellent performance and, especially, the distortion is corrected very well. Since these are the zoom lenses useful as an enlarging lens, trimming can be freely effected by the magnification change of the second and third groups, with the film surface and the printed surface remaining fixed, and the operating distance being varied as desired by movement of the first group. Moreover, the angle of view is maintained constant during the zooming, so that the film size can be changed with the print size remaining constant. More specifically, films from 35 mm size to 6×6 cm size may be printed to a predetermined size without moving the photographic paper surface. The present invention may be sufficiently used not only for the printing of photographs but also as a copying zoom lens.

What we claim is:

1. A short distance zoom lens system for forming an image at a predetermined short distance from the lens system of an object lying at another short distance from the lens system, the zoom lens system consisting of, in order from the object side, a divergent first lens group, a convergent second lens group, and a divergent third lens group, said divergent first lens group comprising one positive lens component and two negative lens components, said convergent second lens group comprising one negative lens component and two positive lens components separated from said negative lens component, and said divergent third lens group comprising one negative lens component, and wherein said convergent second lens group and said divergent third lens group are movable relative to each other along the optical axis for effecting a magnification change, said divergent first lens group being stationary during the magnification change and being movable along the optical axis independently of said second and third groups in accordance with the distance to the object.

2. The zoom lens system according to claim 1, satisfying the following conditions (a)–(d):
   (a) $|\beta_{2W}| < \beta_{2T}| \leq 1$
   (b) $1.5f_2 < |f_2| < 2.5f_1$
   (c) $0.5 < (P/S) < 1.2$
   (d) $0.5 < (q/t) < 1.2$ where $\beta_{2T}$ and $\beta_{2W}$ represent the magnifications of said second group on the long focal length side and on the short focal length side, respectively, $f_1$ and $f_2$ represent the total focal lengths of said first group and said second group, S and P respectively represent the spacing between said first group and said second group on said long focal length side and the spacing between said second group and said third group, and t and q respectively represent the spacing between said first group and said second group on said short focal length side and the spacing between said second group and said third group.

3. The zoom lens system according to claim 1, wherein said divergent first lens group includes, in order from the object side, said positive lens component, said two negative lens components and another positive meniscus lens component having its convex surface facing the object side, said lens components being separate from one another, said convergent second lens group includes, in order from the object side, said two positive lens components, said negative lens component and another positive lens component, said lens components of the second group being separate from one another, and said negative lens component of said divergent third lens group includes a negative meniscus lens component comprising a doublet and having its convex surface facing the image side.

4. The zoom lens system according to claim 3, wherein the lens system parameters are as follows:
Total focal length f=52.9–65.3–80.1

| | | $d_0 = 403.8934$ | | |
|---|---|---|---|---|
| | $r_1 = 84.985$ | $d_1 = 10.2$ | $n_1 = 1.68893$ | $\nu_1 = 31.1$ |
| | $r_2 = -363.927$ | $d_2 = 0.9$ | | |
| | $r_3 = -599.068$ | $d_3 = 1.9$ | $n_2 = 1.52944$ | $\nu_2 = 51.8$ |
| | $r_4 = 38.325$ | $d_4 = 8.5$ | | |
| $f_1 = -97.17$ | $r_5 = 808.067$ | $d_5 = 1.9$ | $n_3 = 1.74443$ | $\nu_3 = 49.4$ |
| | $r_6 = 36.093$ | $d_6 = 7.5$ | | |
| | $r_7 = 42.0$ | $d_7 = 4.9$ | $n_4 = 1.62230$ | $\nu_4 = 53.1$ |
| | $r_8 = 166.523$ | | | |
| | | $d_8 = 34.6194 - 20.15 - 4.9468$ | | |
| | $r_9 = 50.478$ | $d_9 = 2.85$ | $n_5 = 1.50032$ | $\nu_5 = 81.9$ |
| | $r_{10} = -104.125$ | $d_{10} = 0.1$ | | |
| | $r_{11} = 23.244$ | $d_{11} = 3.7$ | $n_6 = 1.50032$ | $\nu_6 = 81.9$ |
| | $r_{12} = 117.891$ | $d_{12} = 4.89$ | | |
| $f_2 = 51.94$ | $r_{13} = -54.464$ | $d_{13} = 1.9$ | $n_7 = 1.67163$ | $\nu_7 = 38.8$ |
| | $r_{14} = 24.276$ | $d_{14} = 6.0$ | | |
| | $r_{15} = 586.998$ | $d_{15} = 6.1$ | $n_8 = 1.63854$ | $\nu_8 = 55.5$ |
| | $r_{16} = -28.238$ | | | |
| | | $d_{16} = 29.5067 - 10.9499 - 10.0795$ | | |
| | $r_{17} = -75.0$ | $d_{17} = 1.5$ | $n_9 = 1.5168$ | $\nu_9 = 64.2$ |
| $f_3 = -413.91$ | $r_{18} = -217.0$ | $d_{18} = 3.0$ | $n_{10} = 1.6727$ | $\nu_{10} = 32.2$ |
| | $r_{19} = -132.064$ | | | |
| | | $B_f = 38.7 - 71.7 - 87.8$ | | | wherein r represents the radius of curvature of each lens surface, d represents the spacing between adjacent lens surfaces, n and $\nu$ respectively represent the refractive index and Abbe number for d-line (wavelength 587.6 nm), the subscripts represent the order from the object side, $B_f$ represents the back focus, and $d_0$ represents the distance from the object surface to the foremost lens surface.

5. The zoom lens system according to claim 3, wherein the lens system parameters are as follows:

Total focal length $f = 52.9 - 65.3 - 80.1$

| | | $d_0 = 403.8934$ | | |
|---|---|---|---|---|
| | $r_1 = 81.912$ | $d_1 = 10.2$ | $n_1 = 1.59507$ | $\nu_1 = 35.6$ |
| | $r_2 = -398.128$ | $d_2 = 0.9$ | | |
| | $r_3 = 231.320$ | $d_3 = 1.9$ | $n_2 = 1.67790$ | $\nu_2 = 55.5$ |
| | $r_4 = 47.0$ | $d_4 = 8.5$ | | |
| $f_1 = -97.17$ | $r_5 = -250.27$ | $d_5 = 1.9$ | $n_3 = 1.713$ | $\nu_3 = 53.9$ |
| | $r_6 = 34.11$ | $d_6 = 6.9$ | | |
| | $r_7 = 41.2$ | $d_7 = 4.9$ | $n_4 = 1.56965$ | $\nu_4 = 49.5$ |
| | $r_8 = 552.564$ | | | |
| | | $d_8 = 36.533 - 22.0641 - 6.8608$ | | |
| | $r_9 = 47.04$ | $d_9 = 2.8$ | $n_5 = 1.65830$ | $\nu_5 = 57.3$ |
| | $r_{10} = -173.84$ | $d_{10} = 0.1$ | | |
| | $r_{11} = 24.2$ | $d_{11} = 3.79$ | $n_6 = 1.6968$ | $\nu_6 = 55.6$ |
| | $r_{12} = 45.770$ | $d_{12} = 4.89$ | | |
| $f_2 = 51.94$ | $r_{13} = -146.51$ | $d_{13} = 1.9$ | $n_7 = 1.80518$ | $\nu_7 = 25.5$ |
| | $r_{14} = 23.2$ | $d_{14} = 5.3$ | | |
| | $r_{15} = 141.79$ | $d_{15} = 9.6$ | $n_8 = 1.62588$ | $\nu_8 = 35.6$ |
| | $r_{16} = -33.244$ | | | |
| | | $d_{16} = 27.9013 - 9.3444 - 8.4740$ | | |
| | $r_{17} = -70.0$ | $d_{17} = 1.5$ | $n_9 = 1.62041$ | $\nu_9 = 60.3$ |
| $f_3 = -413.91$ | $r_{18} = -768.8$ | $d_{18} = 3.0$ | $n_{10} = 1.62230$ | $\nu_{10} = 53.1$ |
| | $r_{19} = -98.862$ | | | |
| | | $B_f = 37.0 - 70.0 - 86.1$ | | | wherein r represents the radius of curvature of each lens surface, d represents the spacing between adjacent lens surfaces, n and $\nu$ respectively represent the refractive index and Abbe number for d-line (wavelength 587.6 nm), the subscripts represent the order from the object side, $B_f$ represents the back focus, and $d_0$ represents the distance from the object surface to the foremost lens surface.

6. The zoom lens system according to claim 1, 2, 3, 4 or 5, wherein said short distance zoom lens system is a lens for printing photographs, photographic paper is disposed on the surface of said object, film is disposed on the image plane, and the image on the film is formed on said photographic paper.

* * * * *